United States Patent

Le Saux et al.

[11] Patent Number: 5,949,519
[45] Date of Patent: Sep. 7, 1999

[54] MULTIFOCAL OPHTHALMIC LENS

[75] Inventors: Gilles Le Saux, Paris; Claude Pedrono, Briis sous Forges; Claire Rossier, Paris, all of France

[73] Assignee: Essilor International, Charenton, Cedex, France

[21] Appl. No.: 09/118,288

[22] Filed: Jul. 17, 1998

[30] Foreign Application Priority Data

Oct. 16, 1997 [FR] France .................... 97 12988

[51] Int. Cl.⁶ .................................................. G02C 7/06
[52] U.S. Cl. ............................................................ 351/169
[58] Field of Search ................................. 351/168, 169, 351/170, 171, 172

[56] References Cited

U.S. PATENT DOCUMENTS 5,270,745 12/1993 Pedrono .................. 351/169
5,488,442 1/1996 Harsigny et al. ........ 351/169
5,719,658 2/1998 Ahsbahs et al. ......... 351/169

OTHER PUBLICATIONS

Guilino, Applied Optics, "Design Philosophy for Progressive Addition Lenses", 32:1:111–117, Jan. 1, 1993.

*Primary Examiner*—Scott J. Sugarman
*Attorney, Agent, or Firm*—Fish & Richardson P.C.

[57] ABSTRACT

A multifocal ophthalmic lens comprising a far vision region, a near vision region and an intermediate vision region is provided having a high near vision region and a wide vision field in the near vision region, the intermediate vision region and in the far vision region. Progression is gentle although the distance between a mounting center on the lens and the point where power addition is 85% higher than power addition at a far vision control point is less than 16 mm, while simultaneously maximum cylinder inside a 20 mm radius circle centered on a geometrical center of the lens is kept at a low value.

17 Claims, 5 Drawing Sheets

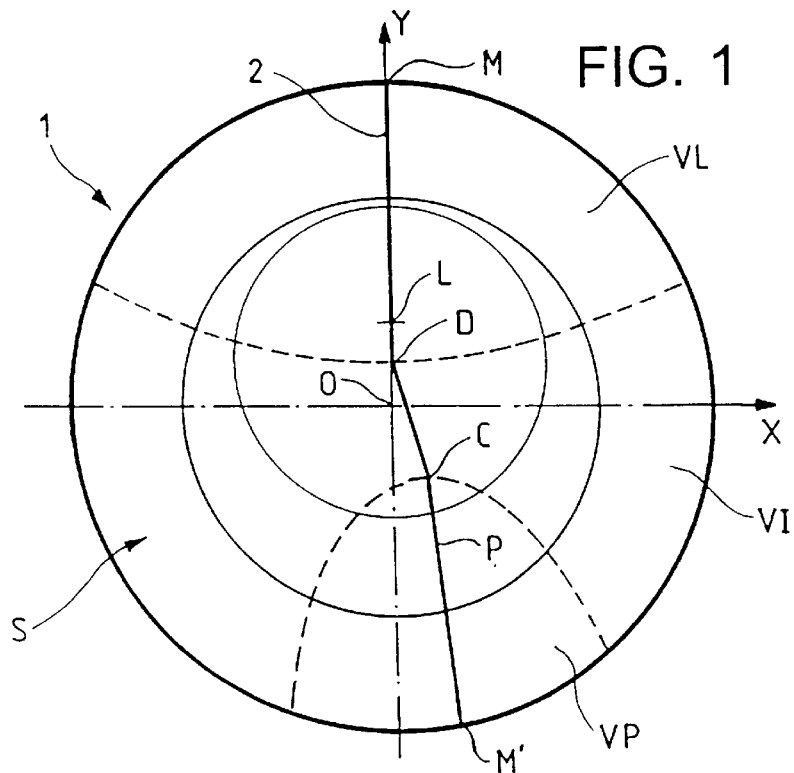
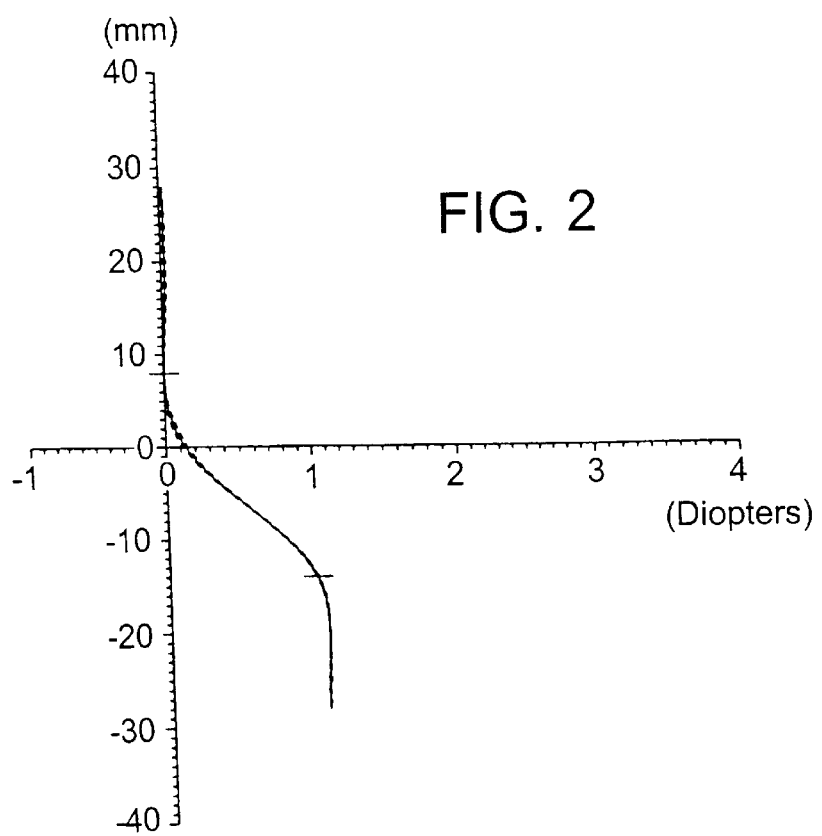

MULTIFOCAL OPHTHALMIC LENS

BACKGROUND OF THE INVENTION

The present invention relates to a multifocal ophthalmic lens, having an aspherical surface which has a mean sphere and a cylinder at every point thereon.

Such lenses are well known; among multifocal lenses one can distinguish lenses known as progressive lenses adapted to vision at all distances, and lenses that are more specifically dedicated to near vision and intermediate vision.

Progressive multifocal ophthalmic lenses comprise a far vision region, a near vision region, an intermediate vision region, and a main meridian of progression passing through the three regions. French patent application 2,699,294, which is incorporated herein by reference, describes, in its preamble, the various elements of a progressive multifocal ophthalmic lens (main meridian of progression, far vision region, near vision region, etc.), as well as the work carried out by the applicant to improve wearer comfort of such lenses.

Applicant has also proposed, in order to better satisfy the visual needs of long sighted people and to improve comfort of progressive multifocal lenses, to adapt the shape of the main meridian of progression, as a function of the power addition value A (French patent application FR-A-2,683, 642).

For such lenses, the power addition value A is defined as the variation in mean sphere between a reference point in the far vision region and a reference point in the near vision region.

Such progressive lenses are generally prescribed as a function of the wearer's ametropia and the power needed for near vision.

Lenses also exist which are more specifically dedicated to near vision; such lenses do not have a a far vision region with a defined reference point like conventional progressive lenses have. Such lenses are prescribed depending on the near vision power the wearer needs, independently of the far vision power. Such a lens is disclosed in an article in the "Opticien Lunetier" dated April 1988, and is sold commercially by the applicant under the Essilor Delta trademark; this lens is also as simple to use and easy to wear as a progressive lens, and it is attractive to long-sighted people not fitted with progressive lenses. This lens is also described in French patent application FR-A-2,588,973. It has a central portion which is equivalent to the single-focus lens that would normally have been employed for correcting long sightedness, in order to ensure satisfactory near vision. It additionally has a slight decrease in power in the upper portion, ensuring that the wearer also has sharp vision beyond the usual near vision field. Finally, the lens has a point at a power value equal to the nominal power for near vision, a higher power region at the lower portion of the lens, and a lower powered region in the top portion of the lens.

Existing multifocal lenses, whether they be progressive or dedicated to near vision can still be further improved as regards their foveal vision performance, in order to improve wearer comfort. Wearers of multifocal lenses do in fact sometimes feel uncomfortable with dynamic vision. Such lenses can also be improved by preserving a near vision region that is sufficiently high to ensure optimum wearer comfort; finally, it is important that wide visual fields be provided in close, intermediate and far vision.

SUMMARY OF THE INVENTION

The present invention provides a multifocal lens which overcome the disadvantages of prior art lenses and which ensures the wearer good visual comfort, a high near vision region and a wide vision field in the near vision region, the intermediate vision region and in the far vision region. It also ensures the wearer enjoys gentle progression in all regions of the lens.

The invention provides a multifocal ophthalmic lens comprising an aspherical surface having at every point thereon a mean sphere and a cylinder, and comprising a far vision region VL, a near vision region VP, an intermediate vision region VI, a main meridian of progression MM' passing through said three regions, in which a principal length of progression as defined herein is shorter than 16 mm, and in which maximum cylinder $C_{max}$ inside a 20 mm radius circle centered on a geometrical center of said lens is defined by the following relation:

$$C_{max}/d \leq 0.50 \cdot P_{mer}$$

where d is a distance between the geometrical center of said lens and a point inside said circle where cylinder is at a maximum value, and $P_{mer}$ is a maximum slope of mean sphere along said main meridian of progression.

According to a preferred embodiment, the main meridian of progression is made up by mid-points of horizontal segments joining respective lines formed by points where cylinder is 0.50 diopter.

In one embodiment, the lens is a multifocal lens dedicated to near vision and intermediate vision, the lens having a power addition defined as a difference between maximum and minimum values of mean sphere on the meridian of progression, inside a 20 mm radius circle centered on the geometrical center of the lens. In this case, principal length of progression is preferably defined as a ratio between power addition and maximum slope of mean sphere on the meridian, and cylinder within the 20 mm radius circle centered on a geometrical center of the lens is less than power addition, and preferably less than 80% of power addition.

According to another embodiment, the lens is a progressive multifocal lens having a reference point for a near vision region, a reference point for a far vision region, and a power addition defined as a difference between the values of mean sphere at these two points.

In this case, the principal length of progression can be defined as a vertical distance between a mounting center and a point on the meridian where mean sphere is 85% higher than mean sphere at the reference point for far vision, and cylinder within the 20 mm radius circle centered on a geometrical center of the lens is less than power addition, and preferably less than 80% of power addition.

In a further preferred embodiment of both lenses, a difference between maximum cylinder on both sides of the meridian, within the 20 mm radius circle centered on a geometrical center of the lens is less than 0.05 diopter, and preferably less than 0.03 diopter.

According to a further preferred embodiment, an angle between half-lines originating from a geometrical center of the lens and passing through points of intersection of the circle and lines formed of points where cylinder is equal to half power addition in the near vision region, is greater than 45°.

According to yet a further preferred embodiment, the far vision region defined in an upper portion of the lens by lines formed by points where cylinder is equal to half power addition, contains an angular sector formed by two half-lines originating at a geometrical center of the lens and having an included angle greater than 130° and preferably comprised between 160 and 165°.

Further features and advantages of the present invention will become more clear from the description which follows of one embodiment of the invention provided by way of non-limiting example with reference to the attached drawings.

BRIEF DESCRIPTION OF THE DRAWINGS

FIG. 1 is a diagrammatical front view of a multifocal progressive lens.

FIG. 2 shows graphically variation in power along the meridian of the lens according to the invention.

DETAILED DESCRIPTION OF PREFERRED EMBODIMENT

Below, we shall employ an orthonormal coordinate system in which the X-axis corresponds to the horizontal axis of the lens and the Y-axis corresponds to the vertical axis; the centre 0 of the reference frame is the geometrical center of the lens.

FIG. 1 is a diagrammatical front view of a known progressive ophthalmic lens, showing the various elements thereof.

Figure 3:
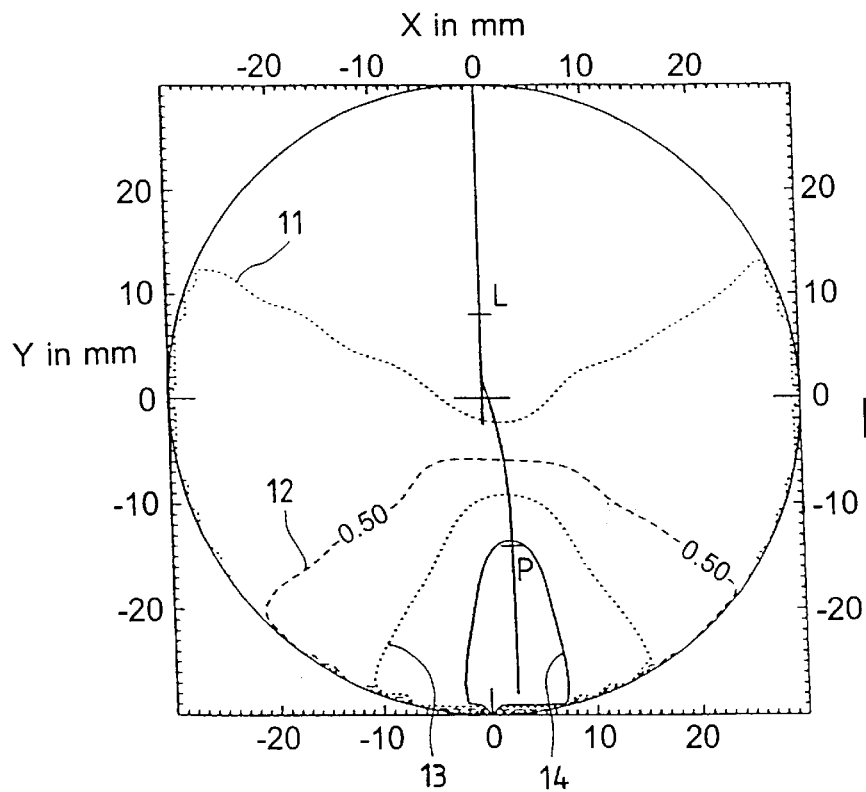
FIG. 3 is a front view of the lens in FIG. 2, showing the main meridian of progression and lines indicating the level of mean sphere.
Figure 4:
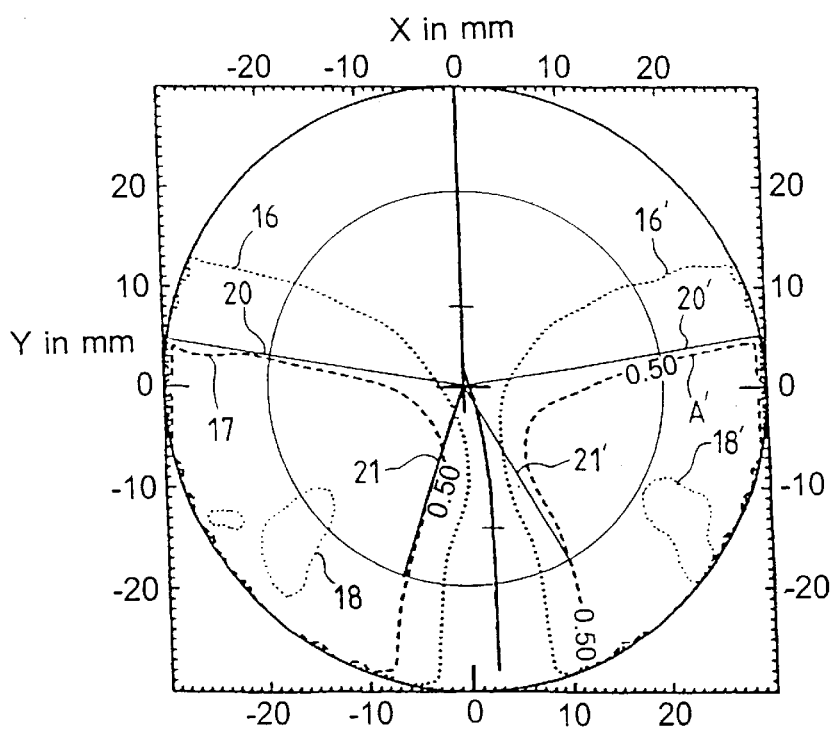
FIG. 4 is a front view of the lens in FIG. 2, showing the main meridian of progression and lines indicating cylinder level.

FIGS. 2 to 4 show the optical characteristics of the lens according to the invention, this lens having a diameter of about 60 mm. In FIGS. 2 to 4, we have described a lens having a power addition of one diopter.

FIGS. 5 to 10 show a similar view, for lenses having a power addition of 2 or 3 diopters.

With reference to FIG. 1, the various elements of a multifocal ophthalmic lens will now be described. Such a lens generally has an aspherical face shown in FIG. 1 and a second face which can be aspherical or toroidal.

For every point on the aspherical surface, a mean sphere D is defined from the formula:

$$D = \frac{n-1}{2}\left(\frac{1}{R_1} + \frac{1}{R_2}\right)$$

in which:

$R_1$ and $R_2$ are the maximum and minimum radii of curvature expressed in meters, and n is the refractive index of the lens material.

Cylinder C is defined by the formula:

$$C = (n-1)\left|\frac{1}{R_1} - \frac{1}{R_2}\right|$$

Isosphere lines are lines constituted by the projection onto a plane tangential to the progressive surface at the geometrical centre O of points on the lens surface having the same value of mean sphere. Similarly, isocylinder lines are lines constituted by the projection onto this same plane of points having the same cylinder.

Conventionally, the lens 1 comprises in its upper portion a far vision region VL, in its lower portion a near vision region VP and, between these two regions, an intermediate region VI. For a progressive lens, a reference point P is defined in the near vision region at which near vision is measured and a reference point L at which far vision is measured. For a lens dedicated to near vision, a reference point P is defined in the near vision region for measuring near vision; however, no corresponding reference point is defined for the far vision region.

On FIG. 1, the main meridian of progression 2 of the lens is shown, passing through the far vision region, the intermediate vision region and the near vision region. This meridian is defined as the locus of the mid-points of horizontal segments delimited by the 0.50 diopter isocylinder line. In the example of FIG. 1, the meridian is essentially composed of three segments, the first one extending substantially vertically from the top of the lens, passing through the point L, down to a point D, referred to as the fitting centre, and located between the far vision control point L and the geometrical centre O. The second segment extends from point D obliquely towards the nasal side of the lens, and the third segment starts from the end C of the second segment and passes through the near vision control point P. Other forms of meridian are possible.

In the case of progressive multifocal ophthalmic lenses, a power addition is defined in a manner known per se, this being the difference in mean sphere between a reference point P in the near vision region and a reference point L in the far vision region.

For multifocal lenses dedicated to near vision and intermediate vision, minimum and maximum values of sphere are measured on the meridian thus defined within the bounds of a 20 mm radius circle centered on the geometrical center of the lens. The power addition is now the difference between these minimum and maximum values of sphere; this definition is substantially equivalent, for progressive lenses, to the conventional definition of power addition and being the difference in sphere between the reference points for near and far vision.

With these definitions, it is generally considered that the limit of the far vision region in the upper portion of the lens is formed by isocylinder lines of a value equal to half the power addition. Similarly, the limit of the near vision region in the lower portion of the lens is set by isocylinder lines of a value equal to half the power addition.

In prior art lenses, and in particular in the case of the applicant's lenses, vision in the region around the main meridian of progression is completely satisfactory.

The inner circle shown on FIG. 1. represents the region scanned by the eye when performing everyday tasks. The size and position of this portion, known as the foveal vision region has been determined by numerous series of measurements carried out in the applicant's laboratories; reference can example be made to IEEE, Portable eye movement recorder by T. Bonnin and N. Bar, Proceedings of the 14th annual international conference of the IEEE Engineering in Medicine and Biology Society 1992, part 4, pages 1668 to 1669, to AAO 1993, to "Optimization of ophthalmic aspheric lenses: recording of eye movement for everyday tasks", N. Bar, T. Bonnin and C. Pedreno, Optometry and vision science 1993, No. 12s, volume 70 page 154, or yet again to ECEM 93, "The use of visual space", a poster by N Bar. This region covers a 30 mm diameter disc centered on the mounting center.

To ensure maximum visual comfort for the wearer, we consider the 40 mm diameter disc centered on the geometrical center of the lens, which encompasses the foveal vision region and, as explained in detail below, it is made a condition that, inside said circle, the quantity $C_{max}/d$ be less than $0.50 \cdot P_{mer}$. The defects such as cylinder are thus mastered within this region thereby ensuring, as far as is possible, clear vision in the foveal vision region.

In order to improve the gentleness of progression of the lenses, and comfort in the foveal vision region, the present invention and sets out to consider a new definition of the characteristics of the lens surface, explained with reference to the following figures. The figures cover the case of progressive multifocal lenses; the invention replies mutatis mutandis to multifocal lenses dedicated to near vision.

FIG. 2 is a a graph showing power along the meridian of the lens according to the intervention, the power addition of this lens being one diopter. The y-axis coordinates of the graph of FIG. 1 are the y-axis coordinates on the lens; the x-axis coordinates give the difference in power, in diopters, from the reference point in the far vision region.

The point having the value y=8 mm on the y-axis along the meridian corresponds to the reference point L for far vision, which, in the case of FIG. 2, is the point of minimum sphere; at this point, mean sphere is 5.2 diopters and cylinder is 0; the point having a y-axis value of 14 mm on the meridian is the reference point P for near vision; at this point, mean sphere is 6.22 diopters and cylinder is 0.02 diopters.

In the case of a progressive multifocal lens, the difference between the y-axis value of the mounting center and the value on the y-axis of a point on the meridian where mean sphere is equal to the sum of mean sphere at the reference point for the far vision region plus 85% of power addition is called the principal length of progression $L_{pp}$. In the example of FIG. 2, mean sphere is 85% higher than power addition for the mean sphere at the far vision reference point at a value on the y axis of y=−10.8 mm; for a mounting center with a y-axis coordinate of y=4 mm, the principal length of progression is 14.8 mm.

In the case of multifocal lenses dedicated to near vision and intermediate vision, the principal length of progression is the ratio between power addition as defined above and the slope of mean sphere along the meridian; this ratio is written as $$L_{pp} = (S_{max} - S_{min})/P_{mer}$$

where $S_{max}$ and $S_{min}$ are respectively the maximum and minimum values of sphere on the meridian and $P_{mer}$ is the maximum value of the slope of sphere along the meridian; this slope of sphere corresponds to the maximum modulus of the slope of sphere with respect to x or y. This ratio $L_{pp}$ is equivalent to a length, and is representative of the length over which mean sphere increases by a value corresponding to power addition.

In both cases, the principal length of progression stands for a position along the meridian corresponding to a variation in mean sphere.

FIG. 2 shows that, at first, sphere remains substantially constant in the far vision region above point L. It shows also that sphere remains substantially constant in the near vision region, below point P. Finally, it shows that the principal length of progression, equal to 14.8 mm, is low, and, notably, is less than 16 mm. This thus ensures the possibility of using near vision in an extensive fashion, with considerable comfort.

FIG. 3 is a front view of the lens in FIG. 2, showing the main meridian of progression and lines of equal mean sphere. Those elements shown on FIG. 2 will be found also in FIG. 3 with the addition of isosphere lines. The isosphere lines in FIG. 3 are the lines 11, 12, 13 and 14 representing respectively mean sphere which is greater by 0.25, 0.5, 0.75 or 1 diopter to mean sphere at the far vision control point L.

FIG. 4 is a front view of the lens in FIG. 2, showing the main meridian of progression and lines of equal cylinder. Those elements shown in FIG. 2 are also present in FIG. 4. As cylinder is low along the main meridian of progression, there are two isocylinder lines for each value of cylinder. The isocylinder lines in FIG. 4 are the lines 16 and 16', 17 and 17', 18 and 18' representing, respectively, a cylinder of 0.25, 0.50 and 0.75 diopters.

As indicated above, in the upper portion of the lens the border of the far vision region is substantially constituted by the 0.5 isocylinder lines 17 and 17'. The lens of the invention thus has a wide far vision region which extends over almost all of the top half of the lens.

In the lower portion of the lens, the border of the near vision region is also substantially constituted by the 0.5 isocylinder lines 17 and 17'. FIG. 4 shows the lens of the invention having a width of the near vision region, measured between the isocylinder lines 17 and 17' at point P which is greater than 13 mm.

If we consider the 40 mm diameter disc centered on the geometrical center of the lens, the maximum value of cylinder inside this disc is 0.741 diopters; this maximum value is reached at a point with coordinates x=−16, y=−12 situated at a distance of 20 mm from the center of the lens.

The lens in FIGS. 2 to 4 thus ensures very gentle progression while still having a short length of progression, and thus a high near vision region.

Quantitatively, this is expressed by the following relation:

$$C_{max}/d \leq 0.50 \cdot P_{mer} \qquad (1)$$

where $C_{max}$ is the maximum value, in diopters, of cylinder within the 40 mm diameter disc centered on the geometrical center of the lens;

d is the distance in mm between the geometrical center and the point on the disc where this maximum value is reached;

$P_{mer}$ is the maximum value of mean sphere slope along the meridian, in diopters per mm.

The value of 0.50 is thus dimensionless.

The relation (1) reflects the fact that the rapid progression in sphere along the meridian does not introduce defects that are too significant in the foveal vision region of the lens: the value $P_{mer}$ expresses the maximum value of slope of sphere; a large value represents a pronounced progression. The value $C_{max}$ reflects disturbances induced at the lens surface, within the bounds of the 40 mm diameter disc, by high progressiveness; this value is weighted by the coefficient 1/d, reflecting the fact that the disturbance causes less problems at the periphery of the lens than at the center thereof.

Relation (1) is not satisfied by any of the prior art progressive ophthalmic lenses tested by the applicant. The prior art lens which most closely matches this criterion is one of the applicant's own lenses, for which the amount $C_{max}/d \cdot P_{mer}$, as measured on the lens, reaches a value of 0.55. The lens thus ensures, for the first time, such a compromise between pronounced progression and particularly well controlled disturbances in the foveal region.

Figure 5:
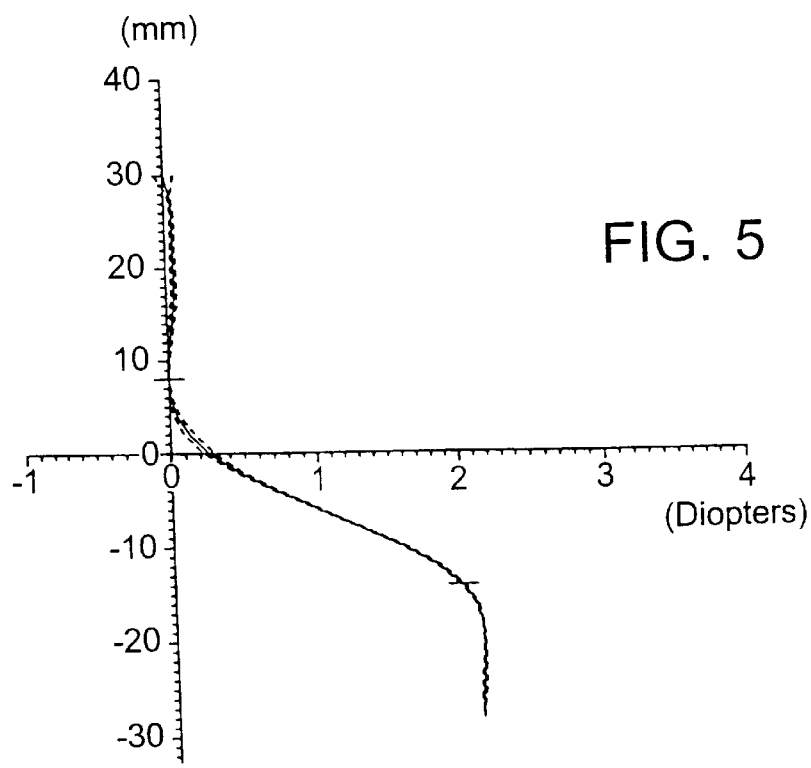
FIG. 5 is a view similar to that in FIG. 2, for a power addition of two diopters.
Figure 6:
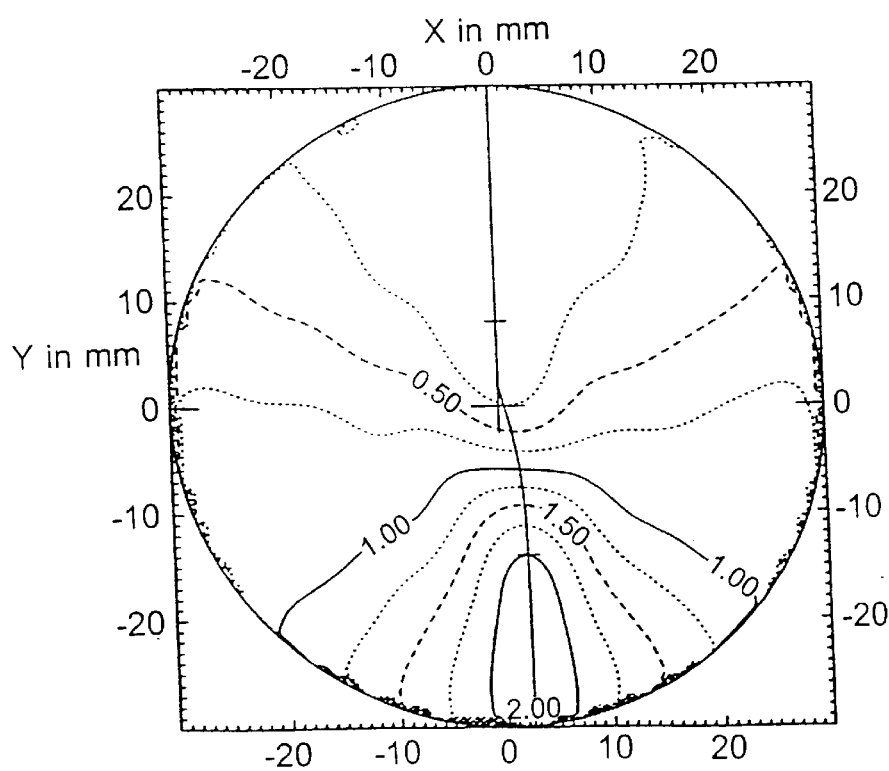
FIG. 6 is a view similar to that in FIG. 3, for a power addition of two diopters.
Figure 7:
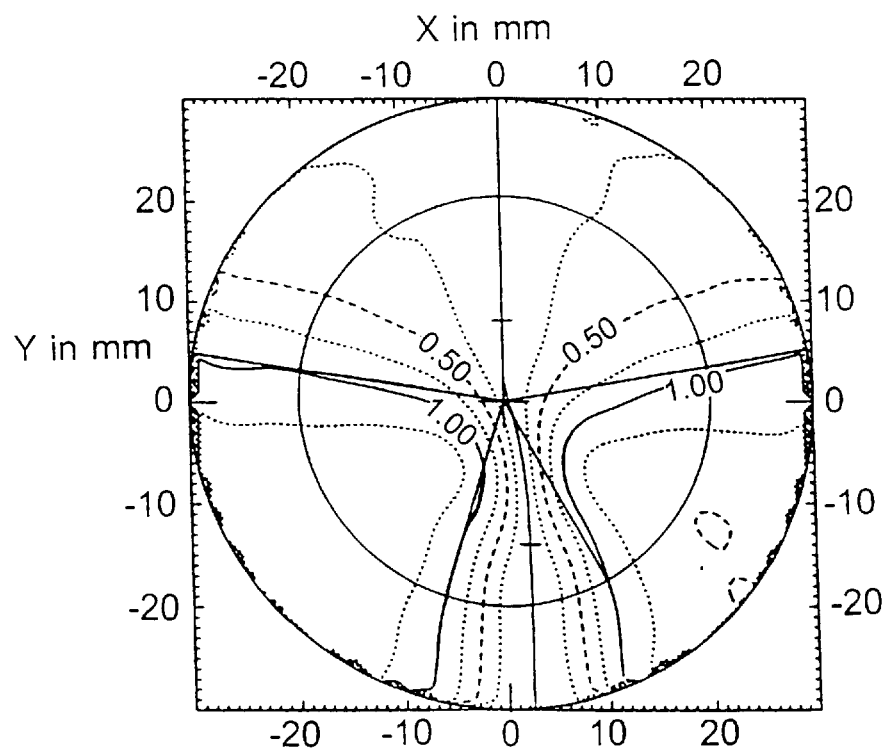
FIG. 7 is a view similar to that in FIG. 4, for a power addition of two diopters.
Figure 8:
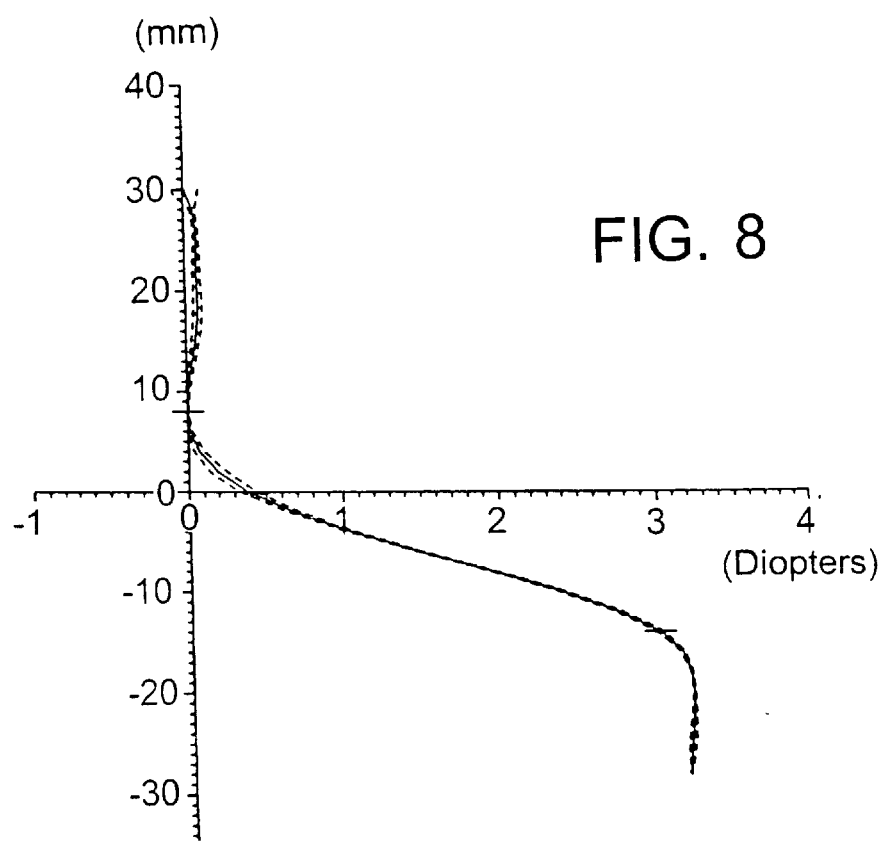
FIG. 8 is a view similar to that in FIG. 2, for a power addition of three diopters.
Figure 9:
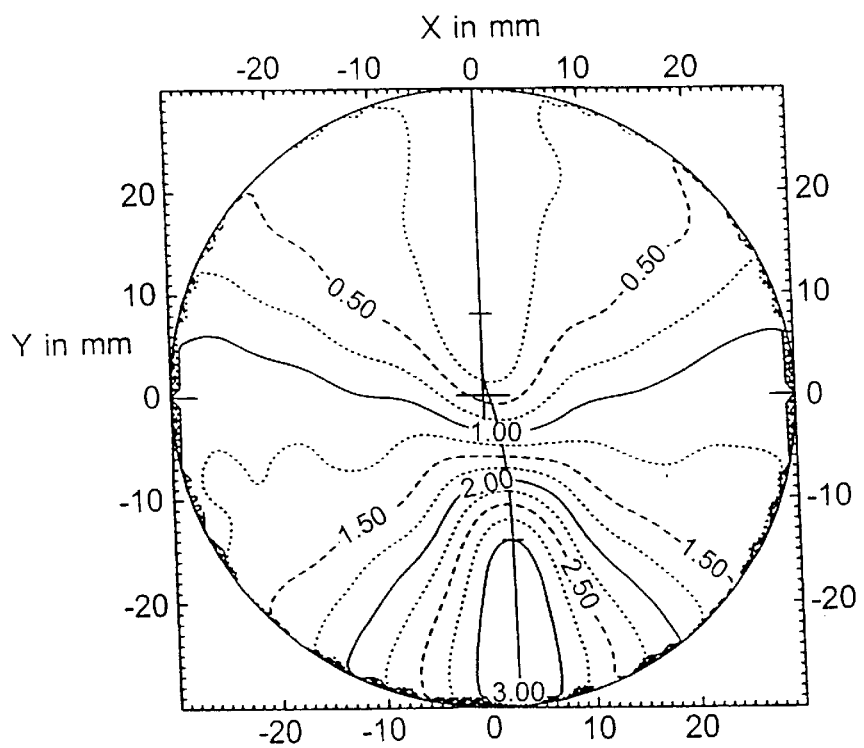
FIG. 9 is a view similar to that in FIG. 3, for a power addition of three diopters.
Figure 10:
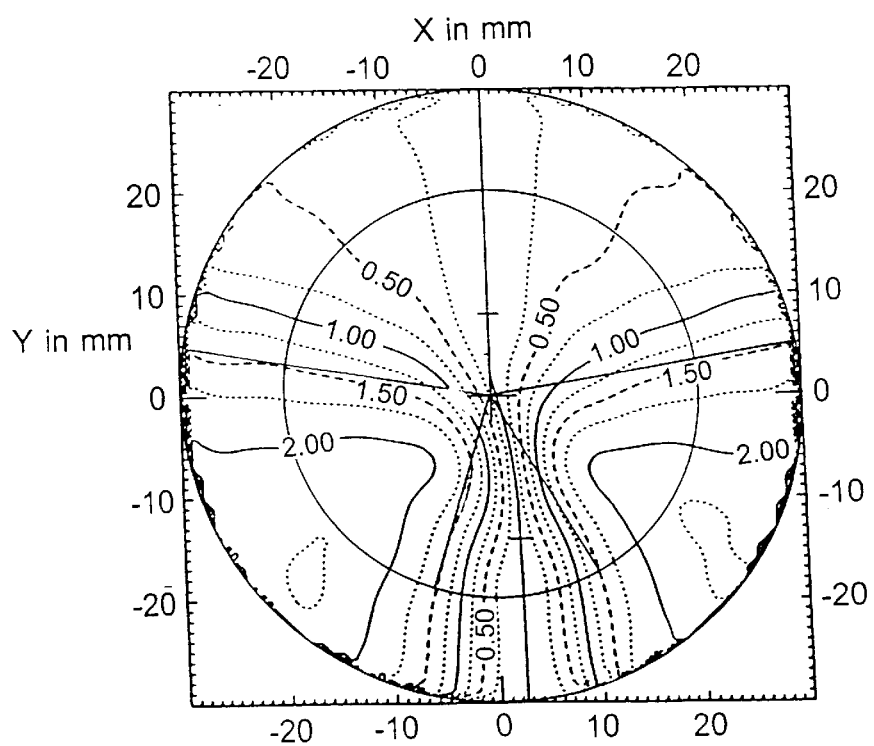
FIG. 10 is a view similar to that in FIG. 4, for a power addition of three diopters.

FIGS. 5 to 7 show similar views to those in FIGS. 2 to 4 but for a lens having a power addition of 2 diopters; FIGS. 8 to 10 show similar views to those in FIGS. 2 to 4, but for a lens having a power addition value of 3 diopters. On FIGS. 6 and 9, isosphere lines are shown in 0.25 diopters steps; on FIGS. 8 and 10, isocylinder lines are shown also in 0.25 diopter steps.

For each lens, the relation is satisfied, with the following values:

$$C_{max}/d = 0.44 \cdot P_{mer}$$

The invention discloses other advantageous characteristics which, in combination with relation (1), make it possible to improve the performance of the lens according to the invention.

As mentioned above with reference to FIG. 2, the principal length of progression is advantageously less than 16 mm; its value is 14.8 mm for the lens of power addition 1; the principal length of progression is substantially identical for a lens of power addition 2 and for a lens of power addition 3. This low length of progression is represented in practice by a near vision region that extends high on the lens.

Advantageously, maximum cylinder inside the 40 mm diameter circle is less than the power addition, and is preferably less than 80% of the power addition. As an example, considering a power addition of one diopter, the maximum cylinder inside the circle is 0.741 diopters; this value is 1.52 diopters for a power addition of 2 diopters and 2.28 diopters for a power addition of 3 diopters.

Provision can be made for the difference between maximum cylinder on both sides of the meridian, inside a 20 mm radius circle centered on the geometrical center of the lens, to be less than 0.05 diopters and preferably, less than 0.03 diopters.

Advantageously, the angle between the half-lines originating from the geometrical center of the lens and passing through the points of intersection of the 20 mm radius circle and lines formed by the points for which cylinder is equal to half the power addition, inside the near vision region, is greater than 45°. In the embodiment of FIGS. 2 to 4, the included angle of these half-lines, bearing the references 21 and 21', is of the order of 45°. Its value is substantially identical for lenses of power addition 2 and 3 of FIGS. 5 et seq.; the corresponding half-lines are also shown on FIGS. 7 and 10.

The invention further proposes that the maximum value of cylinder be substantially the same on the nasal and temporal sides of the lens; this value is advantageously of the order of 75%. of the power addition defined above; in the lens of power addition 1 according to the present invention, maximum cylinder on the nasal side is 0.734 diopters and is attained at a point having coordinates x =17 mm and y=−10 mm. On the temporal side, the maximum value of cylinder is 0.741 diopters and is reached at point having coordinates x=−16 mm and y=−12 mm. This maximum value is reached at points situated at distances of 19.7 and 20 mm from the geometrical center of the lens. This ensures that the point of maximum cylinder is located at the periphery of the region used for foveal vision.

In one embodiment of the invention, the far vision region comprises at least one sector formed by two half-lines that cut at the geometrical center of the lens, the included angle therebetween facing the top portion of the lens being at least 130. This value is advantageously comprised between 160 and 165°. As can be seen on FIG. 4, in the case of a power addition of one diopter, the angle between the half-lines, identified by the references 20 and 20', is 163°. The angle is substantially the same for a power addition of two or three diopters; the corresponding half-lines are also shown on FIGS. 7 and 10.

We shall now give details of the various characteristics that make it possible to provide the various lenses according to the invention. As known per se, the surface of the lenses is continuous and continually derivable three times. As known to those skilled in the art, the surface of progressive lenses is obtained by digital optimization using a computer, setting limiting conditions for a certain number of lens parameters.

One or several of the criteria defined above can be used as limiting conditions.

These criteria apply both for a conventional progressive multifocal lens with a reference point in the far vision region and a reference point in the near vision region, as well as for a multifocal lens that is dedicated to near vision.

One can advantageously start by defining, for each lens of the family, a main meridian of progression. For this, the teachings of French Patent Application FR-A-2,683,642 mentioned above, which is incorporated in its entirety herein by reference, is used. Any other definition of the main meridian of progression can be used, for applying the teaching of the invention. Obviously, this invention is not limited to what has been described: among other things, the aspherical surface could be the surface facing the wearer of the lenses. Additionally, although there was no mention in the description of lenses which can be different for both eyes, this of course obviously applies.

What is claimed is:

1. A multifocal ophthalmic lens comprising an aspherical surface having at every point thereon a mean sphere and a cylinder, and comprising a far vision region VL, a near vision region VP, an intermediate vision region VI, a main meridian of progression MM' passing through said three regions, in which a principal length of progression as defined herein is shorter than 16 mm, and in which maximum cylinder Cmax inside a 20 mm radius circle centered on a geometrical center of said lens is defined by the following relation:

$$C_{max}/d \leq 0.50 \cdot Pmer$$

where d is a distance between the geometrical center of said lens and a point inside said circle where cylinder is at a maximum value, and $P_{mer}$ is a maximum slope of mean sphere along said main meridian of progression.

2. The lens according to claim 1, wherein said main meridian of progression is made up by mid-points of horizontal segments joining respective lines formed by points where cylinder is 0.50 diopter.

3. The lens according to claim 1, wherein the lens is a multifocal lens dedicated to near vision and intermediate vision, said lens having a power addition defined as a difference between maximum and minimum values of mean sphere on said meridian of progression, inside a 20 mm radius circle centered on the geometrical center of said lens.

4. The lens according to claim 3, wherein a principal length of progression is defined as a ratio between power addition and maximum slope of mean sphere on said meridian.

5. The lens according to claim 1, wherein said lens is a progressive multifocal lens having a reference point for a near vision region, a reference point for a far vision region, and a power addition defined as a difference between the values of mean sphere at these two points.

6. The lens according to claim 5, wherein said principal length of progression is defined as a vertical distance between a mounting center and a point on said meridian where mean sphere is 85% higher than mean sphere at said reference point for far vision.

7. The lens according to claim 3, wherein cylinder within said 20 mm radius circle centered on a geometrical center of the lens is less than power addition.

8. The lens according to claim 7, wherein cylinder within said 20 mm radius circle centered on a geometrical center of the lens is less than 80% of power addition.

9. The lens according to claim 5, wherein cylinder within said 20 mm radius circle centered on a geometrical center of the lens is less than power addition.

10. The lens according to claim 9, wherein cylinder within said 20 mm radius circle centered on a geometrical center of the lens is less than 80% of power addition.

11. The lens according to claim 1, wherein a difference between maximum cylinder on both sides of said meridian, within said 20 mm radius circle centered on a geometrical center of the lens is less than 0.05 diopter.

12. The lens according to claim 11, wherein a difference between maximum cylinder on both sides of said meridian, within said 20 mm radius circle centered on a geometrical center of the lens is less than 0.03 diopter.

13. The lens according to claim 3, wherein an angle between half-lines originating from a geometrical center of said lens and passing through points of intersection of said circle and lines formed of points where cylinder is equal to half power addition in said near vision region, is greater than 45°.

14. The lens according to claim 3, wherein said far vision region defined in an upper portion of said lens by lines formed by points where cylinder is equal to half power addition, contains an angular sector formed by two half-lines originating at a geometrical center of said lens and having an included angle greater than 130°.

15. The lens according to claim 14, wherein said angle is comprised between 160 and 165°.

16. The lens according to claim 5, wherein said far vision region defined in an upper portion of said lens by lines formed by points where cylinder is equal to half power addition, contains an angular sector formed by two half-lines originating at a geometrical center of said lens and having an included angle greater than 130°.

17. The lens according to claim 16, wherein said angle is comprised between 160 and 165°.

* * * * *